United States Patent
Luo

(10) Patent No.: US 6,945,445 B2
(45) Date of Patent: Sep. 20, 2005

(54) SUPPORTING TRAY FOR WAVE SOLDERING

(75) Inventor: Yong Min Luo, Shenzhen (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 89 days.

(21) Appl. No.: 10/461,044

(22) Filed: Jun. 13, 2003

(65) Prior Publication Data

US 2004/0222269 A1 Nov. 11, 2004

(30) Foreign Application Priority Data

May 9, 2003 (TW) .......................................... 92208552

(51) Int. Cl.[7] .......................................... B23K 35/363
(52) U.S. Cl. ...................................... 228/37; 228/49.5
(58) Field of Search .................... 228/44.7, 39, 212, 228/37, 260, 49.1, 49.5; 438/108; 269/903, 303, 304, 305

(56) References Cited

U.S. PATENT DOCUMENTS

| | | | | |
|---|---|---|---|---|
| 3,393,659 A | * | 7/1968 | Holt, Jr. et al. ............... | 118/56 |
| 4,948,108 A | * | 8/1990 | Sullivan ....................... | 269/43 |
| 5,540,376 A | | 7/1996 | Asla et al. | |
| 5,775,568 A | * | 7/1998 | Asla et al. ............... | 228/180.1 |
| 5,820,013 A | * | 10/1998 | Ortiz .......................... | 228/43 |
| 6,364,194 B1 | * | 4/2002 | Ciniglio ....................... | 228/36 |
| 6,426,241 B1 | * | 7/2002 | Cordes et al. ............. | 438/108 |
| 6,799,714 B2 | * | 10/2004 | Gleason ..................... | 228/212 |

* cited by examiner

Primary Examiner—Jonathan Johnson
(74) Attorney, Agent, or Firm—Wei Te Chung

(57) ABSTRACT

A supporting tray for moving a PCB (10) in a wave solder machine includes a frame (30) and a circular plate (20). The frame includes a circular opening (33) defined thereof and a graduated scale (31) marked thereon around the circular opening. The circular plate includes a recessed portion (23). Two aligned pointers (21) are marked at two opposite outer sides of the recessed portion. In assembly, the PCB is fixedly received in the recessed portion of the circular plate. The combined PCB and circular plate is then rotatably received in the circular opening of the frame. Then the assembled PCB and the supporting tray are transported to a wave solder machine. The angle of the PCB with respect to a direction of flow of solder waves can be adjusted with an indication of the pointers and the scale. Consequently the optimal angle can be efficiently and accurately ascertained.

9 Claims, 3 Drawing Sheets

SUPPORTING TRAY FOR WAVE SOLDERING

BACKGROUND OF THE INVENTION

1. Field of the Invention

The present invention relates to a printed circuit board (PCB) assembly, and particularly to a supporting tray used during wave soldering of electronic components onto a PCB.

2. Description of the Prior Art

Wave soldering generally comprises three steps. First, a fluxer applies flux to a bottom side of a PCB to clean and prepare solder pad surfaces thereof, so that solder can properly adhere to the solder pad surfaces. Then the PCB is preheated. Finally, the PCB is received in a supporting tray, which is then placed in a wave solder machine. The supporting tray with the PCB is moved across a solder wave in the wave solder machine, thereby electrically connecting leads of various electronic devices to the solder pads of the PCB. Different types of PCBs exhibit various different characteristics during wave soldering, because of different distributions of electronic components thereon. Adjusting parameters of the wave solder machine itself can generally bring about only a 15% improvement in soldering efficacy. Conventionally, the efficacy of soldering is improved by adjusting an angle of the PCB with respect to a direction of flow of the solder waves in the wave solder machine.

A conventional supporting tray is shown in FIG. 3. The supporting tray comprises a base 20', a receiving portion 22' defined in the base 20', and a plurality of retaining clasps 21' provided around the receiving portion 22'. In use, a PCB 10' is received in the receiving portion 22'. The retaining clasps 21' are rotated to retain the PCB 10' in the receiving portion 22'. An angle of the PCB 10' with respect to a direction of flow of the solder waves is fixed according to an angle of the receiving portion 22' relative to the base 20'. Generally, said angle of the receiving portion 22' is determined according to past experience with wave soldering of other identical PCBs 10', to provide optimal soldering quality. However, if it is desired to wave solder another type of PCB, said angle of the receiving portion 22' may not yield optimal soldering quality because of the different distribution of electronic components on the other type of PCB. In such case, said angle of the receiving portion 22' cannot be adjusted, and a new supporting tray having a differently oriented receiving portion must be obtained and tried. If this new supporting tray also fails to yield optimal soldering quality, still another new supporting tray must be obtained and tried, and so on until a new supporting tray yielding optimal soldering quality is finally obtained. This problem may be even further multiplied when it is desired to wave solder yet another type of PCB. The need to provide a plurality of supporting trays, many of which may ultimately prove to be redundant, is time-consuming, wasteful and costly.

Thus, a single supporting tray which overcomes the above-mentioned problems is desired.

BRIEF SUMMARY OF THE INVENTION

Accordingly, an object of the present invention is to provide a supporting tray which can receive a PCB therein and orient the PCB at a desired angle with respect to a direction of flow of solder waves during wave soldering.

To achieve the above object, a supporting tray for receiving and moving a PCB in a wave soldering in accordance with a preferred embodiment of the present invention comprises a frame and a circular plate rotatably received therein. The frame defines a circular opening in a middle portion thereof. A graduated scale is marked on the frame around the circular opening. The circular plate comprises a recessed portion in a middle portion thereof for receiving the PCB. Two aligned pointers are marked at two opposite outer sides of the recessed portion. In assembly, the PCB is fixedly received in the recessed portion of the circular plate. The combined PCB and circular plate is then rotatably received in the circular opening of the frame. Then the assembled PCB and supporting tray are transported to a wave solder machine. The angle of the PCB with respect to a direction of flow of solder waves can be adjusted with an indication of the pointers and the scales. Consequently the optimal angle can be efficiently and accurately ascertained.

Other objects, advantages and novel features of the present invention will be drawn from the following detailed description of the preferred embodiment of the present invention with the attached drawings, in which:

DETAILED DESCRIPTION OF THE INVENTION

Figure 1:
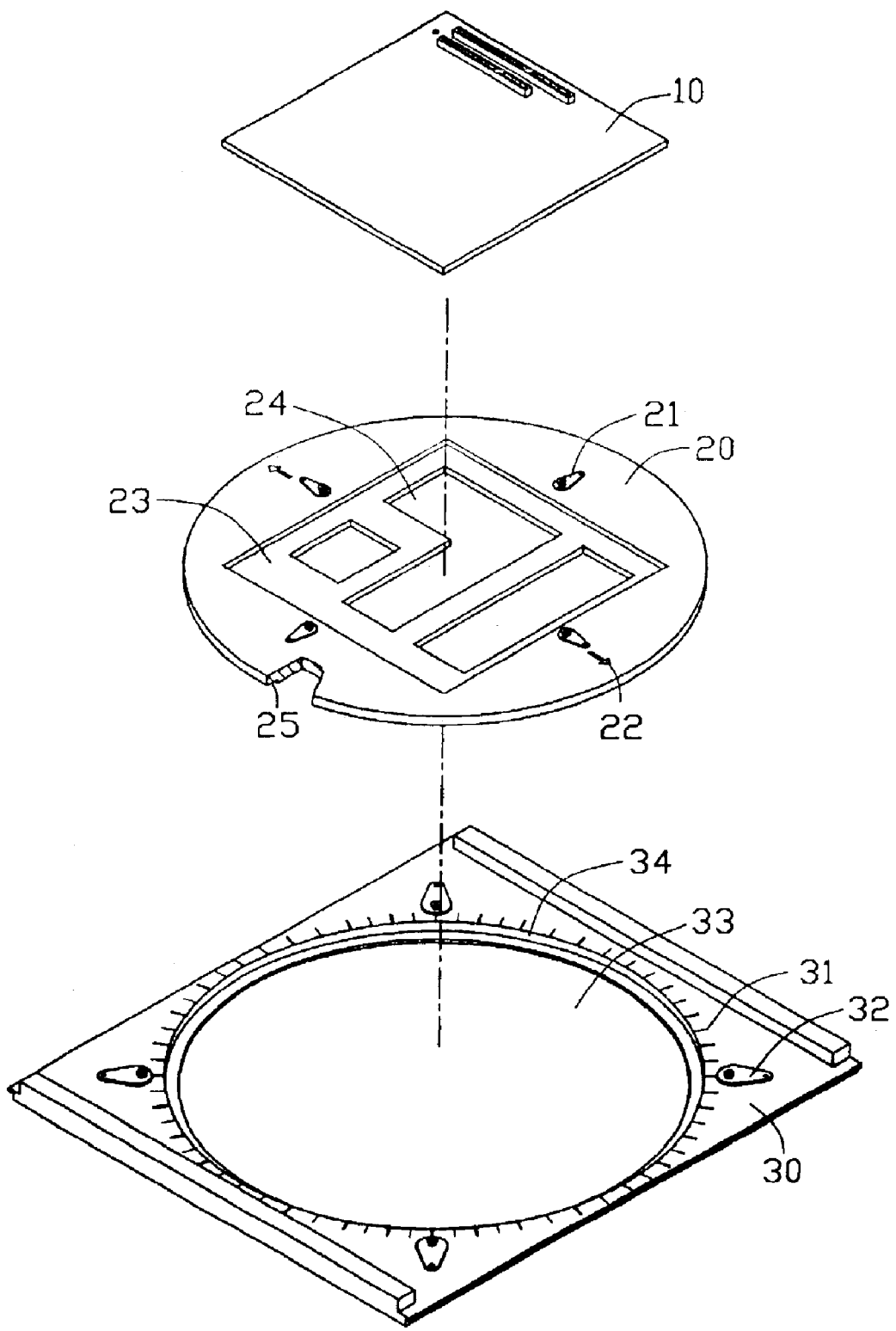
FIG. 1 is an exploded, isometric view of a supporting tray in accordance with the preferred embodiment of the present invention, together with a PCB.

Referring to FIG. 1, a supporting tray in accordance with the preferred embodiment of the present invention comprises a frame 30 and a circular plate 20. A PCB 10 is rotatably received on the circular plate 20. A plurality of electronic components (not shown) is mounted on the PCB.

The circular plate 20 comprises a generally rectangular recessed portion 23 in a middle thereof. A plurality of openings 24 is defined in the recessed portion 23, for exposing pins of the electronic components of the PCB 10 which are to be soldered. Four first retaining clasps 21 are provided on the circular plate 20 adjacent four sides of the recessed portion 23 respectively. Two aligned pointers 22 are marked on the circular plate 20 at outer sides of two opposite of the first retaining clasps 21 respectively. A first annular slot 25 is defined in a circumferential edge portion of a bottom of the circular plate 23.

The frame 30 defines a circular opening 33 in a middle thereof. A graduated scale 31 is marked on the frame 30 around the circular opening 33. Four second retaining clasps 32 are provided at four corners of the frame 30, adjacent the circular opening 33. A second annular slot 34 is defined in a circumferential edge portion of a top of the frame 30 adjacent the opening 33, corresponding to the first annular slot 25 of the circular plate 20.

Figure 2:
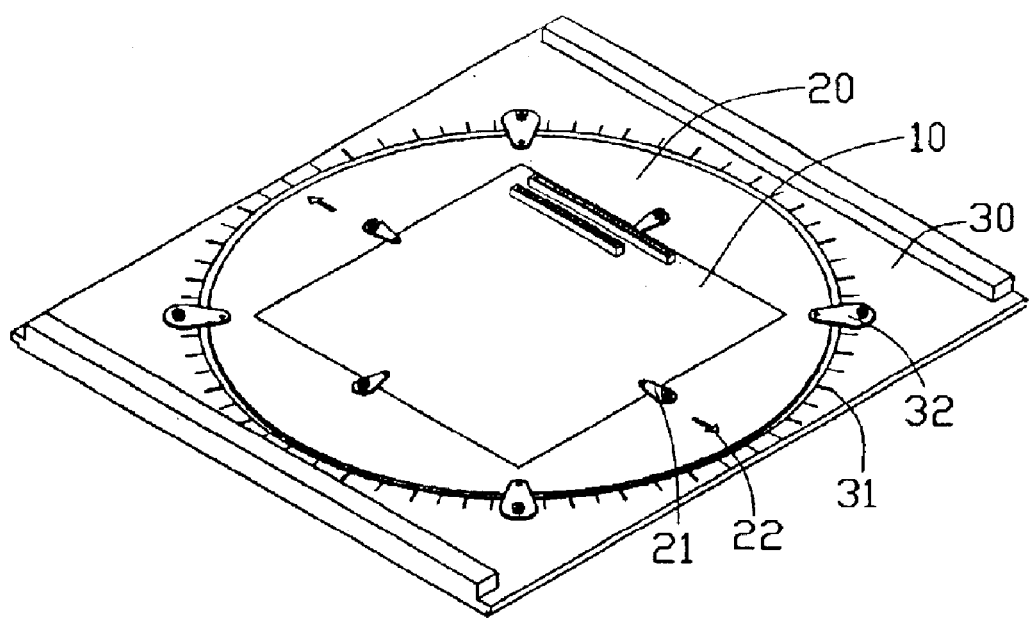
FIG. 2 is an assembled view of FIG. 1.
Figure 3:
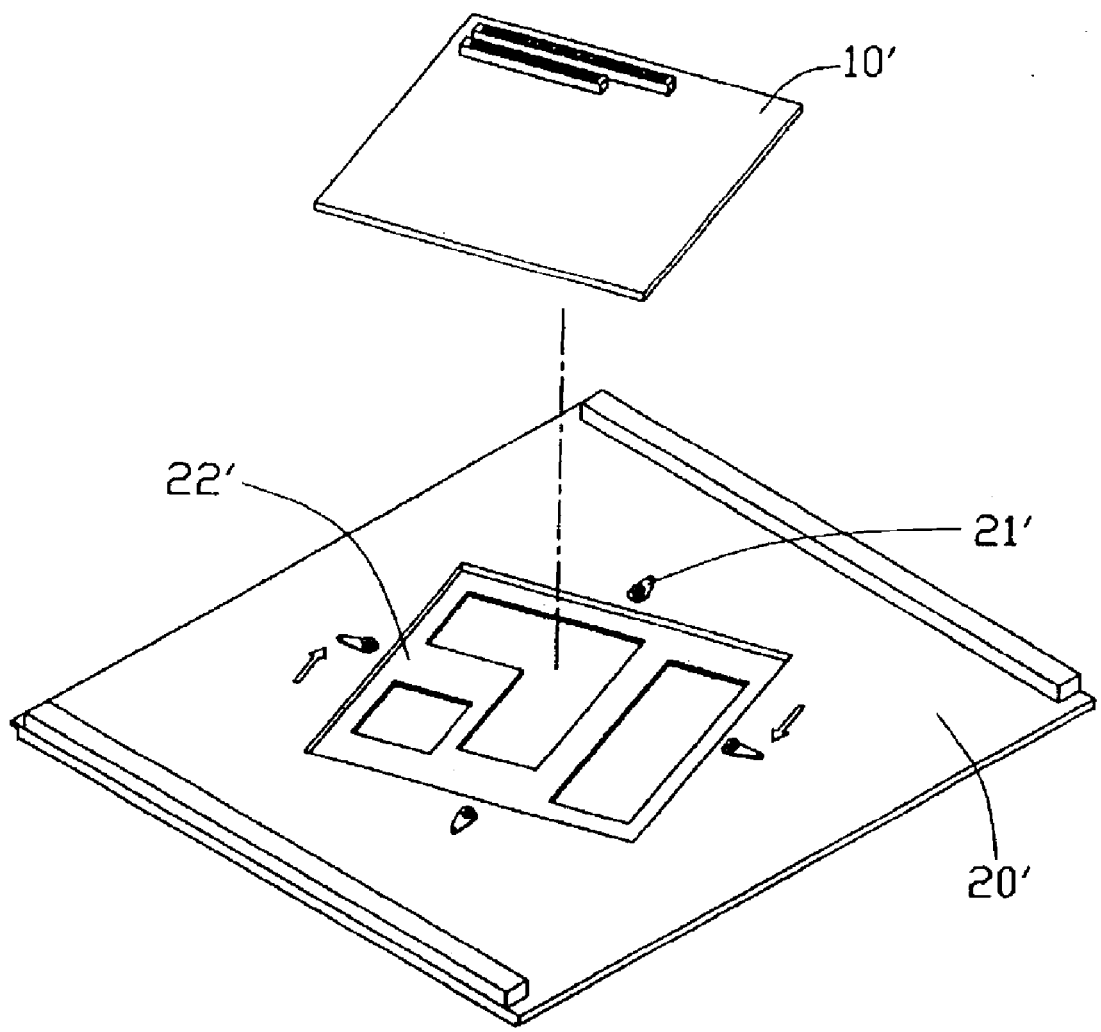
FIG. 3 is an isometric view of a conventional supporting tray, together with a PCB ready to be received on the supporting tray.

Referring to FIG. 2, in assembly, the PCB 10 is received in the recessed portion 23 of the circular plate 20. Said pins of the electronic components are exposed through the openings 24. The first retaining clasps 21 are rotated to retain the PCB 10 in the recessed portion 23. Then the combined PCB 10 and circular plate 20 is positioned in the circular opening 33 of the frame 30. The circumferential edge portion of the circular plate 20 is received in the second annular slot 34 of the frame 30. The circular plate 20 is thereby coplanar with the frame 30. Thus the combined PCB 10 and circular plate 20 is rotatably received in the frame 30.

In use, the circular plate 20 is rotated until the pointers 22 reach respective selected markings of the scale 31. An angle of the supporting tray with respect to a direction of flow of solder waves can be read from the pointers 22 and the scale 31. The second retaining clasps 32 are rotated to retain the circular plate 20 in the desired orientation in the frame 30. The combined PCB 10 and supporting tray are transported to a wave solder machine, and the PCB 10 is wave soldered. If the angle results in optimal soldering quality, then the angle is recorded for future application to other identical PCBs 10. If the angle does not result in optimal soldering quality, a new angle is selected, and an identical replacement PCB 10 is retained in the supporting tray and wave soldered. This procedure is repeated until an angle resulting in optimal soldering quality is attained. The optimal angle is thus both accurately and efficiently ascertained.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A supporting tray for movably receiving a printed circuit board (PCB) for wave soldering, comprising:
    a frame adapted to be fixed on a wave solder machine, the frame defining a circular opening and having a graduated scale marked thereon around the circular opening; and
    a circular plate rotatably received in the circular opening of the frame, the circular plate comprising a recessed portion for retaining the PCB therein.

2. The supporting tray as claimed in claim 1, wherein two aligned pointers are marked at two opposite sides of the recessed portion of the circular plate.

3. The supporting tray as claimed in claim 1, wherein the recessed portion of the circular plate defines a plurality of openings, for exposing pins of electronic components of the PCB for wave soldering.

4. The supporting tray as claimed in claim 1, wherein a plurality of first retaining clasps is provided on the circular plate adjacent a plurality of sides of the recessed portion respectively, for retaining the PCB in the recessed portion.

5. The supporting tray as claimed in claim 4, wherein a plurality of second retaining clasps is provided on the frame adjacent the circular opening, for retaining the circular plate in the circular opening.

6. A tray assembly for wave soldering, comprising:
    a receiving tray comprising a frame and a circular plate rotatably received in the frame, a graduated scale being marked on the frame surrounding the circular plate; and
    a printed circuit board (PCB) received in the circular plate, wherein the circular plate comprises a recessed portion, and the PCB is received in the recessed portion.

7. A universal tray assembly comprising:
    a receiving tray including:
    a frame attached to a wave soldering machine in a fixed relation, and a support plate generally supportably located about said frame, said support plate being adjustably confinably rotatable relative to the frame about substantially only one pivotal axis perpendicular to said frame; and
    a printed circuit board, with at least one solderable electronic component thereon, secured to said support plate in a fixed relation without relative rotation; wherein
    once it is determined that said support plate is rotated, about said only one pivotal axis, to a specific angle with regard to the frame where an optimal result of wave soldering of said electronic component occurs, the support plate is intentionally retained in said specific angle relative to the frame for future use with other printed circuit boards similar to or identical to said printed circuit board.

8. The universal tray assembly as claimed in claim 7, wherein said support plate defines a circular configuration and said frame defines an circular opening to compliantly supportably receive said support plate therein so that the support plate is allowed to be freely rotatable relative to the frame about said only one pivotal axis when no detention means is applied between the frame and the support plate.

9. The universal tray assembly as claimed in claim 7, wherein said printed circuit board defines a rectangular configuration and said support plate defines a rectangular opening to compliantly receive said printed circuit board without relative rotation therebetween.

* * * * *